(12) United States Patent
Haapala

(10) Patent No.: US 7,295,572 B1
(45) Date of Patent: Nov. 13, 2007

(54) STORAGE ROUTER AND METHOD FOR ROUTING IP DATAGRAMS BETWEEN DATA PATH PROCESSORS USING A FIBRE CHANNEL SWITCH

(75) Inventor: Clayton S. Haapala, Minnetonka, MN (US)

(73) Assignee: Cisco Technology, Inc., San Jose, CA (US)

( * ) Notice: Subject to any disclaimer, the term of this patent is extended or adjusted under 35 U.S.C. 154(b) by 959 days.

(21) Appl. No.: 10/403,219

(22) Filed: Mar. 26, 2003

(51) Int. Cl.
*H04J 3/22* (2006.01)

(52) U.S. Cl. ...................................... 370/466; 370/401
(58) Field of Classification Search ................ 370/466, 370/401
See application file for complete search history.

(56) References Cited

U.S. PATENT DOCUMENTS

| | | | |
|---|---|---|---|
| 4,495,617 A | | 1/1985 | Ampulski et al. |
| 5,390,326 A | | 2/1995 | Shah |
| 5,461,608 A | | 10/1995 | Yoshiyama |
| 5,473,599 A | | 12/1995 | Li et al. |
| 5,535,395 A | | 7/1996 | Tipley et al. |
| 5,544,077 A | | 8/1996 | Hershey |
| 5,579,491 A | | 11/1996 | Jeffries et al. |
| 5,600,828 A | | 2/1997 | Johnson et al. |
| 5,666,486 A | | 9/1997 | Alfieri et al. |
| 5,732,206 A | | 3/1998 | Mendel |
| 5,812,821 A | | 9/1998 | Sugi et al. |
| 5,870,571 A | | 2/1999 | Duburcq et al. |
| 5,909,544 A | | 6/1999 | Anderson et al. |
| 5,951,683 A | | 9/1999 | Yuuki et al. |
| 5,991,813 A | | 11/1999 | Zarrow |
| 5,996,024 A | * | 11/1999 | Blumenau .................... 719/326 |
| 5,996,027 A | | 11/1999 | Volk et al. |
| 6,006,259 A | | 12/1999 | Adelman et al. |
| 6,009,476 A | | 12/1999 | Flory et al. |
| 6,018,765 A | | 1/2000 | Durana et al. |

(Continued)

OTHER PUBLICATIONS

*VMware™ ESX Server: User's Manual*, (Version 1.0) [online]. [archived on Jun. 8, 2001]. Retrieved from the Internet: <URL: http://web.archive.org/web/20010608201203/www.vmware.com/suppport>, (2001), 122-124.

(Continued)

*Primary Examiner*—Brian Nguyen
(74) *Attorney, Agent, or Firm*—Schwegman, Lundberg & Woessner P.A.

(57) ABSTRACT

A storage router includes an IP network interface with IP network ports and data path processors. Each of the data path processors may control one of the IP network ports. High speed communication links couple the data path processors with a fiber channel switch. The storage router may route IP datagrams between the data path processors using the fiber channel switch. The fiber channel switch switches fiber channel packets between the data path processors and a plurality of fiber channel switch ports. The fiber channel packets may be encapsulated IP datagrams. Fiber channel packets received at a data path processor may be re-encapsulated and sent back through the fiber channel switch to another data path processor when the packets are destined for IP addresses associated with IP network ports controlled by other data path processors. Among other things, asymmetric data paths, and multiple and redundant communication paths with host systems are supported.

26 Claims, 4 Drawing Sheets

U.S. PATENT DOCUMENTS

| | | |
|---|---|---|
| 6,041,381 A | 3/2000 | Hoese |
| 6,078,957 A | 6/2000 | Adelman et al. |
| 6,108,300 A | 8/2000 | Coile et al. |
| 6,108,699 A | 8/2000 | Moiin |
| 6,131,119 A | 10/2000 | Fukui |
| 6,134,673 A | 10/2000 | Chrabaszcz |
| 6,145,019 A | 11/2000 | Firooz et al. |
| 6,163,855 A | 12/2000 | Shrivastava et al. |
| 6,178,445 B1 | 1/2001 | Dawkins et al. |
| 6,185,620 B1 | 2/2001 | Weber et al. |
| 6,195,687 B1 | 2/2001 | Greaves et al. |
| 6,195,760 B1 | 2/2001 | Chung et al. |
| 6,209,023 B1 | 3/2001 | Dimitroff et al. |
| 6,219,771 B1 | 4/2001 | Kikuchi et al. |
| 6,268,924 B1 | 7/2001 | Koppolu et al. |
| 6,269,396 B1 | 7/2001 | Shah et al. |
| 6,314,526 B1 | 11/2001 | Arendt et al. |
| 6,343,320 B1 | 1/2002 | Fairchild et al. |
| 6,363,416 B1 | 3/2002 | Naeimi et al. |
| 6,378,025 B1 | 4/2002 | Getty |
| 6,393,583 B1 | 5/2002 | Meth et al. |
| 6,400,730 B1 | 6/2002 | Latif et al. |
| 6,449,652 B1 | 9/2002 | Blumenau et al. |
| 6,470,382 B1 | 10/2002 | Wang et al. |
| 6,470,397 B1 | 10/2002 | Shah et al. |
| 6,473,803 B1 | 10/2002 | Stern et al. |
| 6,480,901 B1 | 11/2002 | Weber et al. |
| 6,484,245 B1 | 11/2002 | Sanada et al. |
| 6,574,755 B1 | 6/2003 | Seon |
| 6,591,310 B1 | 7/2003 | Johnson |
| 6,597,956 B1 | 7/2003 | Aziz et al. |
| 6,640,278 B1 | 10/2003 | Nolan et al. |
| 6,654,830 B1 | 11/2003 | Taylor et al. |
| 6,658,459 B1 | 12/2003 | Kwan et al. |
| 6,678,721 B1 | 1/2004 | Bell |
| 6,683,883 B1 | 1/2004 | Czeiger et al. |
| 6,691,244 B1 | 2/2004 | Kampe et al. |
| 6,697,924 B2 | 2/2004 | Swank |
| 6,701,449 B1 | 3/2004 | Davis et al. |
| 6,718,361 B1 | 4/2004 | Basani et al. |
| 6,721,907 B2 | 4/2004 | Earl |
| 6,724,757 B1 | 4/2004 | Zadikian et al. |
| 6,748,550 B2 | 6/2004 | McBrearty et al. |
| 6,757,291 B1 | 6/2004 | Hu |
| 6,760,783 B1 | 7/2004 | Berry |
| 6,763,195 B1 | 7/2004 | Willebrand et al. |
| 6,763,419 B2 | 7/2004 | Hoese et al. |
| 6,771,663 B1 | 8/2004 | Jha |
| 6,771,673 B1 | 8/2004 | Baum et al. |
| 6,799,316 B1 | 9/2004 | Aguilar et al. |
| 6,807,581 B1 | 10/2004 | Starr et al. |
| 6,823,418 B2 | 11/2004 | Langendorf et al. |
| 6,839,752 B1 | 1/2005 | Miller et al. |
| 6,845,403 B2 | 1/2005 | Chadalapaka |
| 6,856,591 B1 | 2/2005 | Ma et al. |
| 6,859,462 B1 | 2/2005 | Mahoney et al. |
| 6,877,044 B2 | 4/2005 | Lo et al. |
| 6,886,171 B2 | 4/2005 | MacLeod |
| 6,892,252 B2 * | 5/2005 | Tate .................. 710/30 |
| 6,895,461 B1 | 5/2005 | Thompson |
| 6,920,491 B2 | 7/2005 | Kim |
| 6,938,092 B2 | 8/2005 | Burns |
| 6,944,785 B2 | 9/2005 | Gadir et al. |
| 7,043,727 B2 | 5/2006 | Bennett et al. |
| 7,120,837 B1 | 10/2006 | Ferris |
| 7,165,258 B1 | 1/2007 | Kuik et al. |
| 2002/0010750 A1 | 1/2002 | Baretzki |
| 2002/0042693 A1 | 4/2002 | Kampe et al. |
| 2002/0049845 A1 | 4/2002 | Sreenivasan et al. |
| 2002/0055978 A1 | 5/2002 | Joon-Bo et al. |
| 2002/0059392 A1 | 5/2002 | Ellis |
| 2002/0065872 A1 | 5/2002 | Genske et al. |
| 2002/0103943 A1 | 8/2002 | Lo et al. |
| 2002/0116460 A1 | 8/2002 | Treister et al. |
| 2002/0126671 A1 * | 9/2002 | Ellis et al. .................. 370/390 |
| 2002/0126680 A1 | 9/2002 | Inagaki et al. |
| 2002/0156612 A1 | 10/2002 | Schulter et al. |
| 2002/0188657 A1 | 12/2002 | Traversat et al. |
| 2002/0188711 A1 | 12/2002 | Meyer et al. |
| 2002/0194428 A1 | 12/2002 | Green |
| 2003/0005068 A1 | 1/2003 | Nickel et al. |
| 2003/0014462 A1 | 1/2003 | Bennett et al. |
| 2003/0018813 A1 | 1/2003 | Antes et al. |
| 2003/0018927 A1 | 1/2003 | Gadir et al. |
| 2003/0058870 A1 | 3/2003 | Mizrachi et al. |
| 2003/0084209 A1 | 5/2003 | Chadalapaka |
| 2003/0084219 A1 * | 5/2003 | Yao et al. .................. 710/300 |
| 2003/0097607 A1 | 5/2003 | Bessire |
| 2003/0182455 A1 | 9/2003 | Hetzler et al. |
| 2003/0208579 A1 | 11/2003 | Brady et al. |
| 2003/0210686 A1 * | 11/2003 | Terrell et al. ............... 370/389 |
| 2004/0024778 A1 | 2/2004 | Cheo |
| 2004/0064553 A1 | 4/2004 | Kjellberg |
| 2004/0141468 A1 | 7/2004 | Christensen |
| 2004/0233910 A1 | 11/2004 | Chen et al. |
| 2005/0055418 A1 | 3/2005 | Blanc et al. |
| 2005/0063313 A1 | 3/2005 | Nanavati et al. |
| 2005/0268151 A1 | 12/2005 | Hunt et al. |

OTHER PUBLICATIONS

Bakker, G., *IP Aliasing*, [online]. [retrieved on Jun. 8, 2005]. Retrieved from the Internet: <URL: http://www.zone-h.org/files/24/ip_aliasing.txt>, (1999), 3 pgs.

Gusella, R., et al., "An Election Algorithm for a Distributed Clock Synchronization Program", *Report No. UCB/CSD 86/257*, University of California, Berkeley, (Dec. 1985), 1-17.

Gusella, R., et al., "The Berkeley UNIX® Time Synchronization Protocol", *UNIX Programmers Manual 4.3*, vol. 2C, Berkeley Software Distrib., (1986), 10 pgs.

Knight, S., et al., *Virtual Router Redundancy Protocol*, Network Working Group, RFC 2338, [online]. [retrieved on May 10, 2002]. Retrieved from the Internet: <URL: http://www.search.ietf.org/rfc/rfc2338.txt>, (1998), 26 pgs.

Lewis, P., "A High-Availability Cluster for Linux", *Linux Journal*, 64, [online]. [retrieved on Oct. 25, 2001]. Retrieved from the Internet: <URL: http://www2.linuxjournal.com/lj-issues/issue64/3247.html>, (Apr. 1994), 11 pgs.

Li, T., et al., *Cisco Hot Standby Router Protocol (HSRP)*, Network Working Group, RFC 2281, [online]. [retrieved on May 10, 2002]. Retrieved from the Internet: <URL: http://www.search.ietf.org/rfc/rfc2281.txt>, (1998), 16 pgs.

Meth, K. Z., et al., "Design of the iSCSI Protocol", *Proceedings of the 20th IEEE Conference on Mass Storage Systems and Technologies*, (Apr. 7-10, 2003), 116-122.

Moore, K., *On the Use of HTTP as a Substrate*, Network Working Group, RFC 3205, [online]. [retrieved on May 10, 2002]. Retrieved from the Internet: <URL: http://www.search.ietf.org/rfc/rfc3205.txt>, (2002), 14 pgs.

Satran, J., et al., "*iSCSI*", IPS Internet Draft, draft-ietf-ips-iSCSI-12.txt, Category: Standards—track, (Apr. 17, 2002), 260 pgs.

Satran, J., et al., "*iSCSI*", IPS Internet Draft, draft-ietf-ips-iSCSI-00, Category: Standards Track, (Nov. 2000), 78 pgs.

Simitci, H., et al., "Evaluation of SCSP over TCP/IP and SCSI over fibre channel connections", *Hot Interconnects*, 9, (Aug. 2001), 87-91.

* cited by examiner

DPP ROUTING TABLE

| DESTINATION | ROUTE TO |
|---|---|
| IP ADDRESS ASSOCIATED WITH PORT CONTROLLED BY CURRENT DPP | CONTROLLED IP INTERFACE |
| IP ADDRESS ASSOCIATED WITH PORT CONTROLLED BY ANOTHER DPP | FIBRE CHANNEL SWITCH |
| FINAL CHANNEL DESTINATION | FIBRE CHANNEL SWITCH |

*FIG. 3*

STORAGE ROUTER AND METHOD FOR ROUTING IP DATAGRAMS BETWEEN DATA PATH PROCESSORS USING A FIBRE CHANNEL SWITCH

TECHNICAL FIELD

The present invention pertains to storage systems and in particular to routing IP datagrams in storage routers.

BACKGROUND

Storage routers allow devices, such as PCs and servers, to utilize the massive storage capability of a storage network. Access to the storage router by such devices may be provided over an IP network and may implement a predetermined physical layer protocol, such as Ethernet. The storage router may access storage devices through the storage network using another predetermined physical layer protocol. In the case of a fibre channel network, the storage router may communicate packets configured in accordance with a fibre channel protocol over the storage network. Some conventional storage systems also implement a storage protocol, such as the Small Computer Systems Interface (SCSI) protocol, for storage related communications between the servers and storage devices through the storage router. In these SCSI systems, SCSI requests, commands and responses may be encapsulated in IP/Ethernet frames for communications between the servers and the storage router. SCSI requests, commands and responses and may also be encapsulated in fibre channel protocol packets for communications between the storage router and storage (i.e., SCSI) devices.

Conventional storage routers typically employ a single/symmetric data path or channel between a particular device on the IP/Ethernet side and a device on the fibre channel/SCSI side. Many individual devices, such as servers and host systems, may wish to utilize the multiple IP/Ethernet interfaces of a storage router. Multiple interfaces may allow increased communications bandwidth between servers and a storage router and may also provide increased reliability through network redundancy. This allows datagrams to be communicated over more than one data path between multiple ports of the storage router and server. Some conventional storage routers may use a high-speed backplane to support these asymmetric data paths. One problem is that the high-speed backplane is very costly and its incorporation into storage routers significantly complicates the implementation further increasing cost and complexity and possibly reducing reliability.

Thus there is a general need for an improved storage router and method for routing datagrams. There is also a need for a storage router and method for routing datagrams within a storage router that supports asymmetric, multiple and/or redundant communication paths with host systems. There is also a need for a storage router and method for routing IP datagrams between data path processors of a storage router. There is also a need for a storage router and method for routing IP datagrams that is less costly. There is also a need for a storage router and method for routing IP datagrams that is less complex. There is also a need for a storage router and method for routing IP datagrams that is more reliable. There is also a need for an improved SCSI-based storage router and method.

SUMMARY OF THE INVENTION

In embodiments, the present invention provides, among other things, an improved storage router and method for routing datagrams. In embodiments, the present invention also provides a storage router and method for routing IP datagrams between data path processors which uses a fibre channel switch.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

FIG. 3 is data path processor routing table suitable for use by a data path processor in accordance with an embodiment of the present invention.

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

In embodiments, the present invention provides, among other things, an improved storage router and method for routing datagrams. In embodiments, the present invention also provides a storage router and method for routing IP datagrams between data path processors which uses a fibre channel switch. In embodiments, the present invention also provides a storage router and method for routing datagrams within a storage router that supports multiple and redundant communication paths with host systems supporting multiple IP network ports. In embodiments, the storage router may include an IP network interface with multiple IP network ports and multiple data path processors. Each of the data path processors may control one or more of the IP network ports. High speed communication links may couple the data path processors with a fibre channel switch. The fibre channel switch may switch fibre channel packets between the data path processors and a plurality of fibre channel switch ports. Fibre channel packets may be received at a data path processor and destined for IP addresses associated with IP network ports controlled by other data path processors. In accordance with embodiments, these packets may be re-encapsulated and sent back through the fibre channel switch to another data path processor which controls the IP network port associated with the packet's destination. Accordingly, multiple and redundant communication paths with host systems may be provided. Furthermore, efficient, high-speed, multiple and redundant communication paths may be provided without requiring a high-speed, high-cost backplane.

Figure 1:
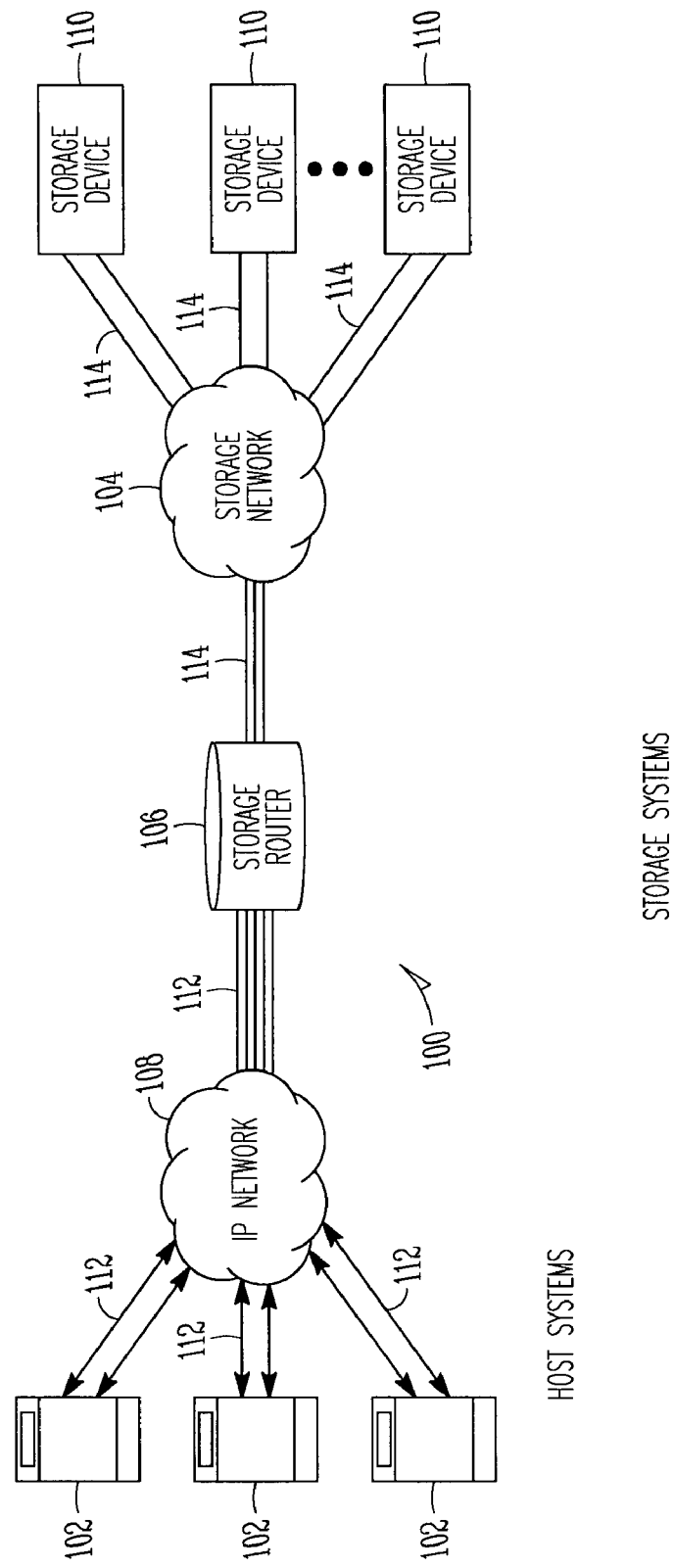
FIG. 1 illustrates a storage system in accordance with an embodiment of the present invention.

FIG. 1 illustrates a storage system in accordance with an embodiment of the present invention. Storage system 100 provides storage capability for host systems 102, and in some embodiments, may be a storage system that implements the Small Computer Systems Interface (SCSI) protocol, although this is not a requirement. The SCSI protocol refers to a family of protocols for communicating with I/O devices, such as storage devices 110. Host systems 102 may send storage requests to storage router 106 over IP network 108. The storage requests may be for storing information or for accessing stored information on storage devices 110, or for querying the status of storage devices 110. In one embodiment, a storage request may be SCSI request that is encapsulated in IP/TCP packets. Storage router 106 may convert the SCSI requests to a form suitable for communication over storage network 104. In one embodiment, network 104 may be a fibre channel network, and storage router 106 may encapsulate the SCSI request in fiber-channel packets.

In accordance with embodiments of the present invention, asymmetric (e.g., two or more different) communication paths 112 between any one of host systems 102 and storage router 106 may be provided. In these embodiments, storage router 106 may, for example, utilize two or more IP network ports to communication with one of host systems 102. In accordance with some additional embodiments of the present invention, asymmetric communication paths 114 may also be provided between storage router 106 and devices 110 of storage network 104.

System 100 allows client devices (not illustrated) access to large scale storage of network 104 by sending requests through hosts 102, which may be general purpose servers. Hosts 102 may connect through IP network 108, which may be the Internet, an Intranet, a LAN or a WAN. A request, which may be a SCSI request, may be generated by host system 102 and encapsulated in one or more IP packets. The encapsulated SCSI request may be routed over IP network 108 and received by storage router 106. The storage router may extract the SCSI request from the one or more IP packets and may route the extracted SCSI request (e.g., through a virtual SCSI router) to storage network 104. Storage router 106 may have a fibre channel network interface for connecting to network 104 which may be running a SCSI protocol.

Although many embodiments of the present invention are described herein with respect to storage network 104 being a fibre channel network through with fibre channel protocol packets are communicated, these embodiments are also suitable to storage networks that implement other network specific protocols, such as InfiniBand, or even to another IP/Ethernet protocol and network. Furthermore, many embodiments of the present invention are described herein with respect to utilizing the SCSI protocol for communications with a storage network. These embodiments are equally suitable to other types of communications, not necessarily with a storage network, including, the use of XML, various types of remote procedure calls (RPCs), and object database communications (ODBC), for example.

One example of suitable storage system may be found in U.S. patent application Ser. No. 10/128,656, filed Apr. 22, 2002, entitled, "SCSI-BASED STORAGE AREA NETWORK", which is assigned to the same assignee as the present application and incorporated herein by reference.

Figure 2:
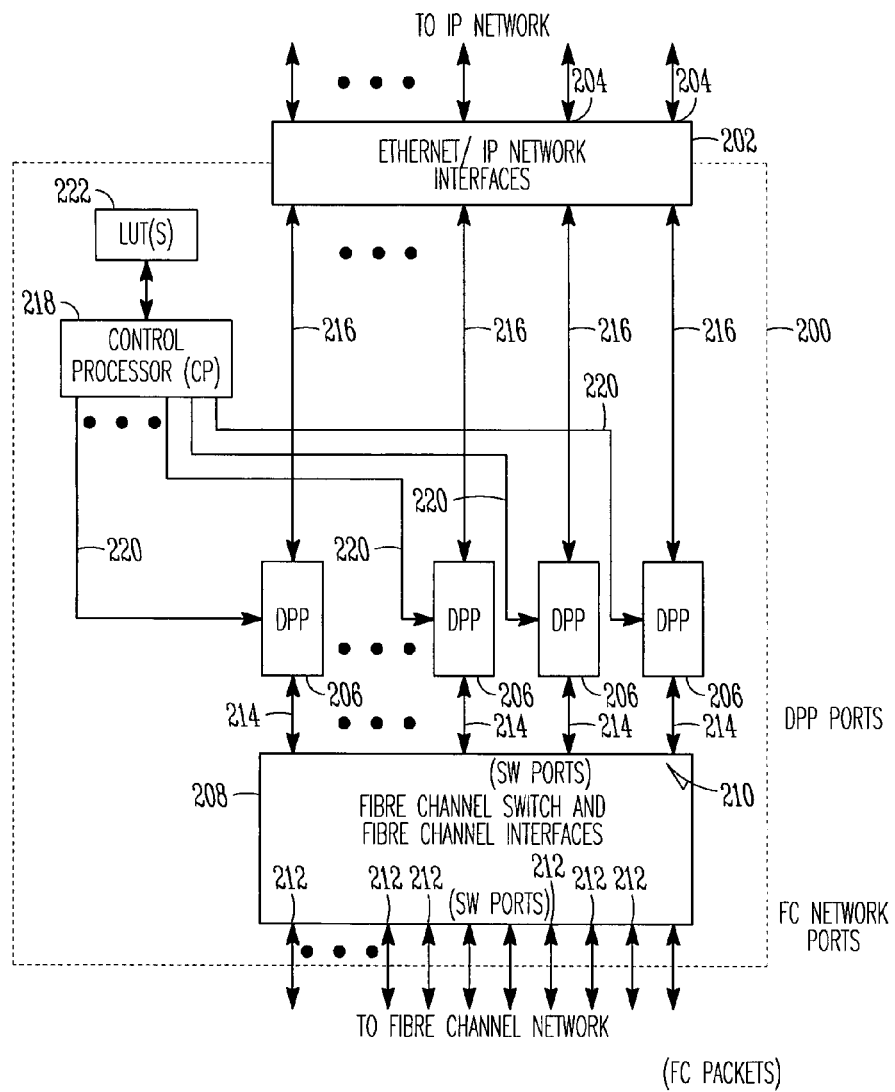
FIG. 2 is a functional block diagram of a storage router in accordance with an embodiment of the present invention.

FIG. 2 is a functional block diagram of a storage router in accordance with an embodiment of the present invention. Storage router 200 may be suitable for use as storage router 106 (FIG. 1) although other storage router configurations may also be suitable. Storage router 200 communicates IP network packets, such as Ethernet frames, with an IP network and communicates storage network protocol packets, such as fibre channel packets, with a storage network, such as a fibre channel network. Storage router 200 may support multiple IP or Ethernet network interfaces with two or more data path processors allowing an asymmetrical data path between the storage router and the IP-side devices, such as host systems 102 (FIG. 1). In other words, IP data packets may leave via any of multiple IP/Ethernet interfaces. This may be desirable for several reasons including, but not limited to, network redundancy. It may also be necessary for specific IP routing and bridging protocols. Storage router 200 allows a data path processor to "route" an outbound IP data packet to another data path processor for forwarding to the proper IP network port. This is explained in more detail below. Conventional storage routers use processing elements coupled to a high speed and high cost fabric, such as a backplane or crossbar switch. This is commonly seen in chassis and line-card devices. Embodiments of the present invention may eliminate the need for the high cost backplane for forwarding packets between data path processors.

Storage router 200 includes IP network interface 202 which may have a plurality of IP network ports 204. Storage router 200 may also include a plurality of data path processors 206. In embodiments, each of data path processors (DPP) 206 may control an associated one of IP network ports 204. Storage router 200 may also include switch 208, which may be a fibre channel switch having a plurality of switch ports 210 and 212. In embodiments, fibre channel switch 208 may switch fibre channel packets between any of fibre channel switch ports 210, 212. Although switch 208 is described as a fibre channel switch for switching fibre channel packets, embodiments of the present invention are equally suitable for use with types of switching elements for switching packet over interfaces that implement other protocol communications.

In a conventional SCSI network router, there may be a single data path processor, and the data path between a device on the IP/Ethernet side and a devices on the fibre channel/SCSI side are the same in both directions (e.g., symmetric). In other words, packets communicated in both directions with a device, such host system 102 (FIG. 1) may take a path through IP network 108 (FIG. 1) utilizing the same IP network port of storage router 200.

At least some of the fibre channel switch ports 210, 212 are data path processor ports 210 which are coupled to data path processors 206 with high speed communication links 214. Other fibre channel switch ports may be fibre channel network ports 212 which couple to a network, such as network 104 (FIG. 1). Fibre channel switch 208 may be almost any high speed switch architecture including a crossbar switch.

Storage router 200 may also include additional high speed communication links 216 coupling each data path processor 206 to IP network interface 202. Each of high speed communication links 216 may be associated with at least one of IP network ports 204.

Although switch 208 is illustrated as being part of storage router 200, in other embodiments, the switch function may be located externally to the storage router. In these embodiments, switch 208 may be coupled with the storage router using high speed communication links 214.

In embodiments, high speed communication links 214 may have data rates that range from 500 megabits to two-gigabits and greater. High speed communication links 216 may have data rates that range from 100 megabits to one-gigabit and greater. In at least one embodiment, high speed communication links 214 may be approximately two-gigabit communication links, and high speed communication links 216 may be approximately one-gigabit communication links. In embodiments, IP network interface 202 may include one or more Gigabit Ethernet interfaces for communicating iSCSI commands, requests and responses encapsulated in IP/Ethernet frames.

Storage router 200 may also include control processor 218 to provide control information to data path processors 206. Control processor 218 may be coupled to data path processors 206 by individual control links 220. Control links 220 may have data rates up to approximately 100-megabits and greater. Control processor 218 manages the initialization of storage router 200 and may implement the human user interface. For purposes of initialization and management of data processors 206 and querying of their operational status, control processor 218 and data processors 206 may communicate via control links 220. For cost purposes, these links may be slower than data path links 214 or 216, and are less suitable for the routing of IP data packets.

For simplicity, storage router 200 is illustrated as having only four data path processors 206, controlled network interfaces 204, associated high speed communication links 214 and switch ports 210, however embodiments of the present invention may include as few as two, and as many as a hundred or more data path processors 206, controlled network interfaces 204, associated high speed communication links 214 and switch ports 210.

In general, data path processors 206 communicate IP packets with IP network interface 202 and communicate storage network protocol packets, such as fibre channel packets, with fibre channel switch 208. When an IP packet is received at a data path processor from the IP network interface, the data path processor may encapsulate or modify the packet to conform to a protocol supported by the storage network and may send the packet to switch 208. When a fibre channel packet is received at a data path processor from one of fibre channel interfaces of switch 208, the data path processor may determine what IP network port 204 the packet's destination is associated with. If the network port is the network port controlled by that data path processor, the data path processor may encapsulate the packet as an IP/Ethernet frame and send the packet over link 216 to interface 202. If the IP network port is an IP network port controlled by another data path processor, the data path processor may encapsulate the packet as an IP/fibre channel packet and send the packet over link 214 through switch 208 where it may be switched to the appropriate data path processor. A receiving data path processor may utilize look-up-table (LUT) 222 to help determine what to do with the packet.

FIG. 3 shows data path processor routing table 300 which may be suitable for use by a data path processor. Routing table 300 may be suitable for use as LUT 222 although other routing tables may also be used. As illustrated in row 302, when a data path processor receives a packet having a destination that is an IP address associated with an IP network port controlled by the data path processor, the packet may be routed to the controlled IP interface. As illustrated in row 304, when a data path processor receives a packet having a destination that is an IP address associated with an IP network port controlled by another data path processor, the packet may be routed to the fibre channel switch for switching to the other data path processor. As illustrated in row 306, when a data path processor receives a packet having a destination that is a destination in the storage network, the packet may be routed to the fibre channel switch for switching to an interface with the storage network.

In one embodiment, interface 202 receives encapsulated SCSI packets from IP network 108 (FIG. 1), the encapsulated SCSI packets are sent to the controlling data path processor 206 over one of links 216, the data path processor 206 may extract the SCSI portion of the packet, and may modify or encapsulate the SCSI portion to conform with a network protocol (e.g., fibre channel, parallel SCSI, or iSCSI) supported by network 104 (FIG. 1) and may send the modified SCSI packet to switch 208 for communicating over network 104 (FIG. 1). The SCSI packet may then be delivered to its designated SCSI device 110 (FIG. 1).

In embodiments, the IP network interface may provide at least first and second communication paths between a host system and the storage router respectively with first and second IP network ports. The first IP network port may be controlled by a first of the data path processors and the second IP network port may be controlled by a second of the data path processors. The first and second communication paths may comprise an asymmetric data path with the host system. In these embodiments, the first data path processor may receive a fibre channel packet containing SCSI data having a destination associated with the first IP network port, and when the first communication path with the host is operational, the first data path processor may encapsulate at least a portion of the packet as an iSCSI protocol data unit (PDU) inside a TCP inside an IP datagram, and may transfer the IP datagram as an Ethernet frame to the first IP network port. In these embodiments, when the first communication path with the host is non-operational, the first data path processor may re-encapsulate/modify IP datagram in a fibre channel packet modified to identify the fibre channel switch port associated with the second data path processor to identify the second IP network port. The first data path processor may transfer the modified fibre channel packet to the fibre channel switch which may switch the packet to the data path processor port of the fibre channel switch associated with the second data path processor for receipt by the second data path processor. The second data path processor may forward the IP datagram as a frame to the second IP network port.

Although system 200 are illustrated as having several separate functional elements, one or more of the functional elements may be combined and may be implemented by combinations of software configured elements, such as processing elements including digital signal processors (DSPs), and/or other hardware elements. For example, processing elements, such as data path processors 206 and control processor 218 may comprise one or more microprocessors, DSPs, application specific integrated circuits (ASICs), and combinations of various hardware and logic circuitry for at least performing the functions described herein. Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer readable memory that may be volatile or non-volatile memory or a combination thereof. Moreover, as used herein, data refers to one or more storage data elements, which can include portions of files, a single file, a file extent, a database, a storage device partition, a volume, sets of volumes and the like. The data need not reside on a single storage device and may span multiple storage devices.

Figure 4:
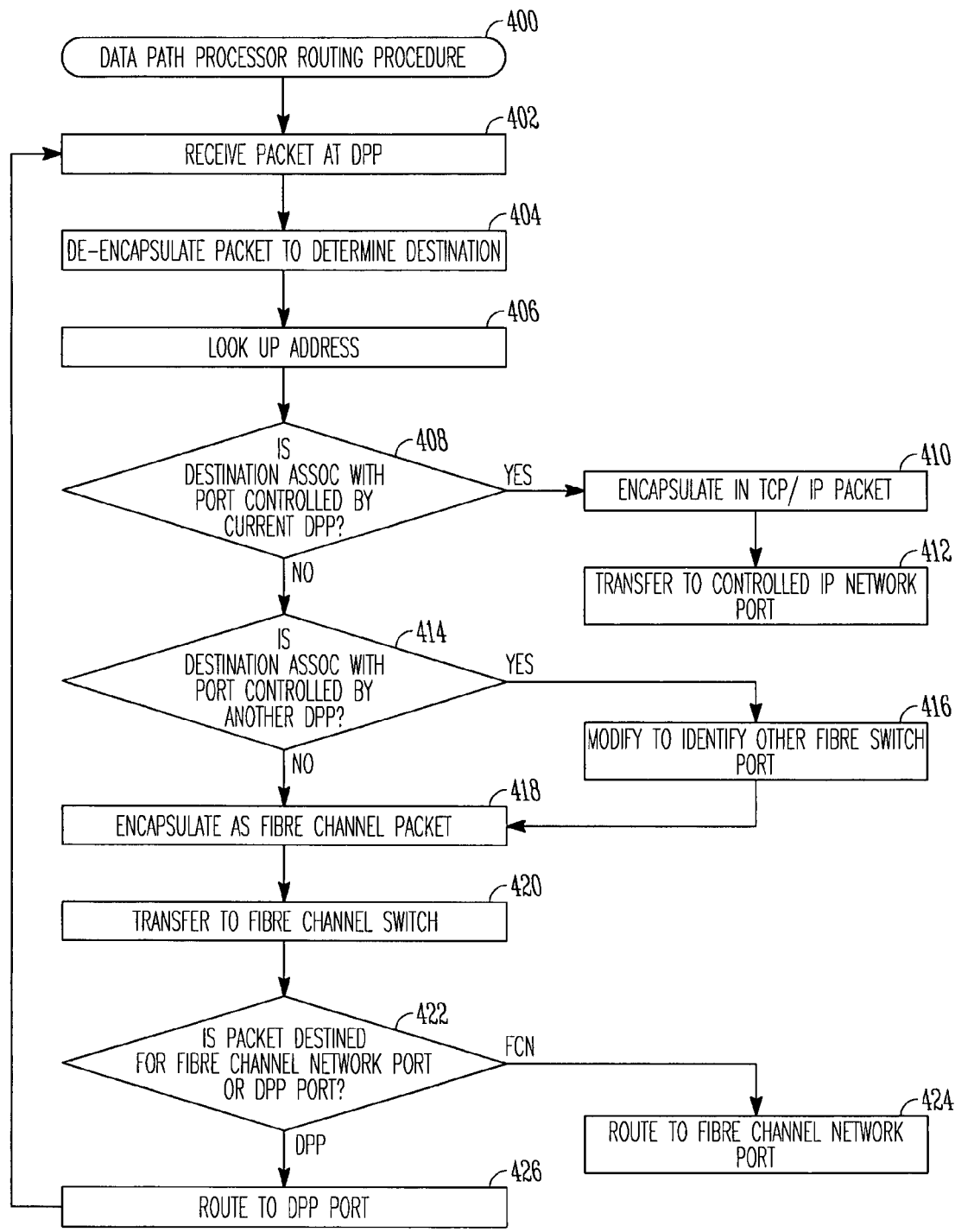
FIG. 4 is a flow chart of a data path processor routing procedure in accordance with an embodiment of the present invention.

FIG. 4 is a flow chart of a data path processor routing procedure in accordance with an embodiment of the present invention. Data path processor routing procedure 400 may be performed by elements of a storage router including a data path processor, such as data processor 206 (FIG. 2) although other storage router configurations may also be used. In embodiments, portions of procedure 400 may be performed by one or more processors configured with software which are part of a control processor, such as control processor 218 (FIG. 2) and a data path processor. Other procedures may be concurrently running on such processors. In general, procedure 400 allows packets, including datagrams, to be routed among the data path processors of a storage router allowing, for example, more than one IP network port to be used for asymmetric data-path communications with a single host system. Procedure 400 may allow a storage router to provide this functionality without the use of a high-cost switching backplane employed by conventional storage routers.

In operation 402, a data path processor receives a packet. The packet may be an IP/Ethernet frame received from the IP network port controlled by the data path processor, such as one of ports 204. The packet may also be SCSI packet or a packet configured in accordance with another particular storage network protocol, received from fibre channel switch 208 (FIG. 2).

In operation 404, the data path processor may remove any encapsulation or wrapping from the packet to determine the packet's destination. The encapsulation or wrapping, for example, may include an Ethernet header for Ethernet frames, or a fibre channel header for fibre channel packets. In operation 406, the data path processor may look up the packet's destination in a look-up table or routing table to determine the packet's routing at least within the storage router.

Operation 408 determines if the packet's destination is associated with the IP network port controlled by the data path processor. When the packet's destination is associated with the IP network port controlled by the data path processor, operations 410 and 412 may be performed. In operation 410, at least a portion of the packet may be encapsulated as, for example, an IP/Ethernet frame, and in operation 412, the packet may be transferred over a high speed communication link, such as link 216 (FIG. 2) to the IP network port controlled by the data path processor. Operations 410 and 412 may be performed in a situation where a fibre channel packet is received in operation 402 from fibre channel switch 208 (FIG. 2) over one of high speed communication links 214 (FIG. 2), and at least a data portion of the packet is destined for an IP address associated with the IP network port controlled by the data path processor that received the fibre channel packet in operation 402.

When operation 408 determines that the packet's destination is not associated with the IP network port controlled by the data path processor, operation 414 may be performed. Operation 414 may determine if the packet's destination is an IP address associated with an IP network port controlled by another data path processor. When operation 414 determines that the packet's destination is an IP address associated with an IP network port controlled by another data path processor, operation 416 is performed. In operation 416, the data path processor may modify the packet to identify the fiber switch port associated with the other data processor, and operation 418 may be performed.

When operation 414 determines that the packet's destination is not an IP address associated with an IP network port controlled by another data path processor, operation 418 may also be performed. In this situation, the packet's destination may be a destination in a fibre channel network, such as network 104 (FIG. 1).

In operation 418, at least a portion of the packet may be encapsulated as a protocol packet, such as a fibre channel protocol packet, and may include adding a fibre channel header. The fibre channel header of a packet from operation 416 may identify the data path processor port of the fibre channel switch (e.g., one of ports 210) associated with the other data path processor which controls the IP network port associated with the packet's IP network destination. The fibre channel header of a packet directly from operation 414 may identify a fibre channel network port (e.g., one of ports 212) associated with the packets destination in the fibre channel network.

In one embodiment, operation 416 may be combined with operation 418 in which when a packet's destination is an IP address associated with an IP network port controlled by another data path processor, the data path processor encapsulates the packet as a fibre channel packet identifying the data path processor port of the fibre channel switch (e.g., one of ports 210) associated with the other data path processor which controls the IP network port associated with the packet's IP network destination.

In operation 420, the encapsulated packet generated in operation 418 is transferred to the fibre channel switch over high speed communication link 214 (FIG. 2). In operation 422, the fibre channel switch may use the fibre channel header to determine which one of the fibre channel switch ports to switch the packet to. In the case of packets destined for the fibre channel network (FCN), the packet may be switched to one of ports 212 (FIG. 2) and operation 424 may be performed. In the case of packets destined for one of the data path processors, the packet may be switched to one of ports 210 (FIG. 2) and operation 426 may be performed.

In operation 424, the packets destined for the fibre channel network may be sent over the fibre channel network interface to a destination in the fibre channel network. In operation 426, the fibre channel packets destined for one of the data path processors may be switched to one of ports 210 and over the associated high speed communication link 214 to a data path processor. The data path processor receiving the fibre channel packet may perform at least some of operations 402 through 420 for the received fibre channel packet. In the case in which the packet was sent by another data path processor which did not control the IP network port associated with the packets destination, the data path processor receiving the packet may perform operations 402 through 412 to send at least a portion of the packet to a destination in the IP network. Accordingly, more that one data path processor and controlled IP network port may be used for asymmetric data path communications with a single host system.

Although the individual operations of procedure 400 are illustrated and described as separate operations, one or more of the individual operations may be performed concurrently and nothing requires that the operations be performed in the order illustrated.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A storage router comprising:
   an IP network interface having a plurality of IP network ports;
   a plurality of data path processors, wherein each one of the data path processors controls at least one of the IP network ports; and
   a fibre channel switch to switch fibre channel packets between the data path processors and a plurality of fibre channel switch ports,
   wherein when a destination address of a fibre channel packet received at a first of the data path processors is an IP address associated with an IP network port controlled by another data path processor, the first data path processor modifies at least a portion of the packet to identify a fibre channel switch port associated with the another data path processor and transfers the modified fibre channel packet to the fibre channel switch which switches the modified fibre channel packet to the fiber channel switch port associated with the another data path processor.

2. The storage router of claim 1 wherein at least some of the fibre channel switch ports are data path processor ports, wherein the storage router further comprises a high speed communication link coupling each the data path processor with one of the data path processor ports, and
   wherein other of the fibre channel switch ports are fibre channel network ports to couple with a fibre channel network.

3. The storage router of claim 2 wherein the fibre channel switch receives fibre channel packets from the data path processors at the data path processor ports, and receives fibre channel packets from the fibre channel network at the fibre channel network ports, the fibre channel switch to switch the received packets between any of the data path processor ports and the fibre channel network ports.

4. The storage router of claim 3 wherein when the destination address of the fibre channel packet received at the first data path processor is an IP address associated with an IP network port controlled by the first data path processor, the first data path processor to encapsulate at least a portion of the packet as an internet small computer systems interface (iSCSI) protocol data unit (PDU) within a TCP/IP datagram, the first data path processor to transfer the datagram as an Ethernet frame to the controlled IP network port.

5. The storage router of claim 4 wherein when the destination address of an IP packet received at the first data path processor is a fibre channel address within the fibre channel network, the first data path processor to encapsulate at least a portion of the IP packet as a fibre channel packet to identify one of the fibre channel network ports, the first data path processor to transfer the fibre channel packet to the fibre channel switch, the fibre channel switch to route the fibre channel packet to the identified fibre channel network port.

6. The storage router of claim 3 wherein the IP network interface provides at least first and second communication paths between a host system and the storage router respectively with first and second IP network ports, the first IP network port being controlled by the first data path processor, the second IP network port being controlled by a second of the data path processors, the first and second communication paths comprising an asymmetric data path.

7. The storage router of claim 6 wherein when the first data path processor receives a fibre channel packet having a destination associated with the first IP network port, and when the first communication path with the host is operational:
   the first data path processor to encapsulate at least a portion of the packet as an internet small computer systems interface (iSCSI) protocol data unit (PDU) within a TCP/IP packet, and the first data path processor to transfer the TCP/IP packet as an Ethernet frame to the first IP network port.

8. The storage router of claim 2 wherein the high speed communication links are first high speed communication links, and
   wherein the storage router further comprises a second high speed communication link coupling each data path processor to the IP network interface, each of the second high speed communication links being associated with at least one of the IP network ports.

9. The storage router of claim 8 further comprising a control processor to provide control information to each of the data path processors, the control processor coupled to the data path processors by control links.

10. The storage router of claim 1 wherein the fibre channel switch is a crossbar switch.

11. The storage router of claim 1 wherein the IP network interface receives Ethernet frames over an IP network, the Ethernet frames being IP datagrams,
    wherein the fibre channel packets include a fibre channel header identifying one of the fibre channel switch ports and a small computer systems interface (SCSI) portion, and
    wherein the Ethernet frames comprise a TCP/IP packet with an Ethernet header, the TCP/IP packet including an internet small computer system interface (iSCSI) portion wrapped around the SCSI portion.

12. The storage router of claim 11 wherein the SCSI portion comprises command sets and associated data to control devices in the storage router, the SCSI portion being stored on the devices in the storage router, the iSCSI portion comprising protocols to implement communications between a host system and the storage router over a TCP/IP network.

13. A storage router comprising:
    an IP network interface having a plurality of IP network ports;
    a plurality of data path processors, wherein each one of the data path processors control at least one of the IP network ports; and
    a fibre channel switch to switch fibre channel packets between the data path processors and a plurality of fibre channel switch ports,
    wherein at least some of the fibre channel switch ports are data path processor ports, wherein the storage router further comprises a high speed communication link coupling each data path processor with one of the data path processor ports, wherein other of the fibre channel switch ports are fibre channel network ports to couple with a fibre channel network, wherein the fibre channel switch receives fibre channel packets from the data path processors at the data path processor ports, and receives fibre channel packets from the fibre channel network at the fibre channel network ports, the fibre channel switch to switch the received packets between any of the data path processor ports and the fibre channel network ports, wherein when a destination address of a fibre channel packet received at a first of the data path processors is an IP address associated with an IP network port controlled by the first data path processor, the first data path processor to encapsulate at least a portion of the packet as an internet small computer systems interface (iSCSI) protocol data unit (PDU) within a TCP/IP datagram, the first data path processor to transfer the datagram as an Ethernet frame to the controlled IP network port, and wherein when the destination address of the fibre channel packet is an IP address associated with another IP network port controlled by another data path processor, the first data path processor to modify at least a portion of the packet, the modified fibre channel packet to identify the fibre channel switch port associated with the another data path processor, the first data path processor to transfer the modified fibre channel packet to the fibre channel switch, the fibre channel switch to switch the packet to the data path processor port of the fibre channel switch associated with the another data path processor.

14. A storage router comprising:
an IP network interface having a plurality of IP network ports;
a plurality of data path processors, wherein each one of the data path processors control at least one of the IP network ports; and
a fibre channel switch to switch fibre channel packets between the data path processors and a plurality of fibre channel switch ports,
wherein at least some of the fibre channel switch ports are data path processor ports,
wherein the storage router further comprises a high speed communication link coupling each data path processor with one of the data path processor ports,
wherein other of the fibre channel switch ports are fibre channel network ports to couple with a fibre channel network,
wherein the fibre channel switch receives fibre channel packets from the data path processors at the data path processor ports, and receives fibre channel packets from the fibre channel network at the fibre channel network ports, the fibre channel switch to switch the received packets between any of the data path processor ports and the fibre channel network ports,
wherein the IP network interface provides at least first and second communication paths between a host system and the storage router respectively with first and second IP network ports, the first IP network port being controlled by a first of the data path processors, the second IP network port being controlled by a second of the data path processors, the first and second communication paths comprising an asymmetric data path, and wherein when the first data path processor receives a fibre channel packet having a destination associated with the first IP network port, and when the first communication path with the host is operational:
the first data path processor to encapsulate at least a portion of the packet as an internet small computer systems interface (iSCSI) protocol data unit (PDU) within a TCP/IP packet, and the first data path processor to transfer the TCP/IP packet as an Ethernet frame to the first IP network port, and wherein when the first communication path with the host is non-operational:
the first data path processor to modify at least a portion of the fibre channel packet, the modified fibre channel packet to identify the fibre channel switch port associated with the second data path processor and to identify the second IP network port, the first data path processor to transfer the modified fibre channel packet to the fibre channel switch, the fibre channel switch to switch the packet to the data path processor port of the fibre channel switch associated with the second data path processor for receipt by the second data path processor, the second data path processor to encapsulate at least a portion of the modified fibre channel packet as an iSCSI PDU within a TCP/IP packet, and the second data path processor to transfer the TCP/IP packet as an Ethernet frame to the second IP network port.

15. A method of routing packets within a storage router comprising:
when a destination of a packet is an IP address associated with an IP network port controlled by a data path processor, the method includes:
encapsulating at least a portion of the packet as an Ethernet frame; and
transferring the packet to the controlled IP network port, and
when the destination is an IP address associated with an IP network port controlled by another data path processor, the method includes:
encapsulating at least a portion of the packet as a fibre channel packet to identify a fibre channel switch port associated with the another data path processor; and
transferring the packet over a high-speed communication link to a fibre channel switch, the fibre channel switch to switch the fibre channel packet to the identified fibre channel switch port for receipt by the another data path processor.

16. The method of claim 15 when the destination is a fibre channel address in a fibre channel network, the method comprises:
encapsulating the packet as a fibre channel packet to identify a fibre channel switch port associated with the fibre channel address; and
transferring the packet over the high-speed communication link to the fibre channel switch, the switch to switch the fibre channel packet to the identified fibre channel switch port for transfer to the fibre channel network.

17. The method of claim 16 further comprising:
providing at least first and second communication paths between a host system and a IP network interface of the storage router respectively with first and second IP network ports, the first IP network port being controlled by a first of a plurality of data path processors, the second IP network port being controlled by a second of the data path processors.

18. The method of claim 17 further comprising:
receiving at the first data path processor a fibre channel packet having a destination associated with the first IP network port, and when the first communication path with the host is operational:
encapsulating, by the first data path processor at least a portion of the packet as an internet small computer systems interface (iSCSI) protocol data unit (PDU) within a TCP/IP packet; and
transferring the TCP/IP packet as an Ethernet frame to the first IP network port.

19. The method of claim 18 wherein when the first communication path with the host is non-operational, the method includes the first data path processor:
modifying at least a portion of the fibre channel packet, the modified fibre channel packet to identify the fibre channel switch port associated with the second data path processor and to identify the second IP network port;
transferring the modified fibre channel packet to the fibre channel switch, the fibre channel switch to switch the packet to a data path processor port of the fibre channel switch associated with the second data path processor for receipt by the second data path processor,
the method further including the second data path processor:
encapsulating at least a portion of the modified fibre channel packet as an iSCSI PDU within a TCP/IP packet; and
transferring the TCP/IP packet within an Ethernet frame to the second IP network port.

20. An article comprising a computer-readable storage medium having stored thereon instructions, that when executed by a digital computing platform, result in routing packets within a storage router including when a destination of a packet is an IP address associated with an IP network port controlled by a data path processor by:
encapsulating at least a portion of the packet as an Ethernet frame; and
transferring the packet to the controlled IP network port, and
when the destination is an IP address associated with an IP network port controlled by another data path processor, the instructions result in:
encapsulating at least a portion of the packet as a fibre channel packet to identify a fibre channel switch port associated with the another data path processor; and
transferring the packet over a high-speed communication link to a fibre channel switch, the fibre channel switch to switch the fibre channel packet to the identified fibre channel switch port for receipt by the another data path processor.

21. The article of claim 20 wherein the instructions, when further executed by the digital computing platform result in, when the destination is a fibre channel address in a fibre channel network:
encapsulating the packet as a fibre channel packet to identify a fibre channel switch port associated with the fibre channel address; and
transferring the packet over the high-speed communication link to the fibre channel switch, the switch to switch the fibre channel packet to the identified fibre channel switch port for transfer to the fibre channel network.

22. The article of claim 21 wherein the instructions, when further executed by the digital computing platform result in:
providing at least first and second communication paths between a host system and a IP network interface of the storage router respectively with first and second IP network ports, the first IP network port being controlled by a first of a plurality of data path processors, the second IP network port being controlled by a second of the data path processors;
receiving at the first data path processor a fibre channel packet having a destination associated with the first IP network port, and when the first communication path with the host is operational:
encapsulating, by the first data path processor at least a portion of the packet as an internet small computer systems interface (iSCSI) protocol data unit (PDU) within a TCP/IP packet; and
transferring the TCP/IP packet as an Ethernet frame to the first IP network port.

23. A system comprising:
means for encapsulating; and
means for transferring,
wherein when a destination of a packet is an IP address associated with an IP network port controlled by a data path processor, the means for encapsulating encapsulates at least a portion of the packet as an Ethernet frame, and the means for transferring transfers the packet to the controlled IP network port, and
wherein when the destination is an IP address associated with an IP network port controlled by another data path processor, the means for encapsulating encapsulates at least a portion of the packet as a fibre channel packet to identify a fibre channel switch port associated with the another data path processor, and the means for transferring transfers the packet over a high-speed communication link to a fibre channel switch, the fibre channel switch to switch the fibre channel packet to the identified fibre channel switch port for receipt by the another data path processor.

24. The system of claim 23 when the destination is a fibre channel address in a fibre channel network, the means for encapsulating encapsulates the packet as a fibre channel packet to identify a fibre channel switch port associated with the fibre channel address, and the means for transferring transfers the packet over the high-speed communication link to the fibre channel switch, the switch to switch the fibre channel packet to the identified fibre channel switch port for transfer to the fibre channel network.

25. The system of claim 24 further comprising:
means for providing at least first and second communication paths between a host system and a IP network interface of a storage router respectively with first and second IP network ports, the first IP network port being controlled by a first of a plurality of data path processors, the second IP network port being controlled by a second of the data path processors.

26. The system of claim 25 further comprising:
means for receiving at the first data path processor a fibre channel packet having a destination associated with the first IP network port, and when the first communication path with the host is operational, the means for encapsulating encapsulates at least a portion of the packet as an internet small computer systems interface (iSCSI) protocol data unit (PDU) within a TCP/IP packet, and the means for transferring transfers the TCP/IP packet as an Ethernet frame to the first IP network port.

\* \* \* \* \*

UNITED STATES PATENT AND TRADEMARK OFFICE
CERTIFICATE OF CORRECTION

PATENT NO. : 7,295,572 B1 Page 1 of 1
APPLICATION NO. : 10/403219
DATED : November 13, 2007
INVENTOR(S) : Haapala It is certified that error appears in the above-identified patent and that said Letters Patent is hereby corrected as shown below:

On the title page, item (56), under "Other Publications", in column 2, line 4, delete "suppport" and insert -- support --, therefor.

In column 9, line 40, in Claim 2, before "data" delete "the".

Signed and Sealed this

First Day of July, 2008

JON W. DUDAS
*Director of the United States Patent and Trademark Office*